US007829157B2

(12) United States Patent
Johnson et al.

(10) Patent No.: US 7,829,157 B2
(45) Date of Patent: Nov. 9, 2010

(54) METHODS OF MAKING MULTILAYERED, HYDROGEN-CONTAINING THERMITE STRUCTURES

(75) Inventors: James Neil Johnson, Scotia, NY (US); Ilissa Brooke Schild, Saratoga Springs, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1062 days.

(21) Appl. No.: 11/399,263

(22) Filed: Apr. 7, 2006

(65) Prior Publication Data

US 2010/0119728 A1    May 13, 2010

(51) Int. Cl.
| | |
|---|---|
| H05H 1/46 | (2006.01) |
| B05D 3/04 | (2006.01) |
| B05D 3/06 | (2006.01) |
| C23C 16/56 | (2006.01) |
| B05D 1/36 | (2006.01) |
| B05D 1/38 | (2006.01) |

(52) U.S. Cl. .................. 427/535; 427/404; 427/405; 427/419.2; 427/419.3; 427/575

(58) Field of Classification Search .................. None
See application file for complete search history.

(56) References Cited

U.S. PATENT DOCUMENTS

| | | |
|---|---|---|
| 1,399,953 A | 12/1921 | Fulton |
| 2,200,742 A | 5/1940 | Hardy |
| 2,200,743 A | 5/1940 | Hardy |
| 3,056,255 A | 10/1962 | Thomsen |
| 3,254,996 A | 6/1966 | MacDonald |
| 3,261,732 A | 7/1966 | Eilo |
| 3,325,316 A | 6/1967 | MacDonald |
| 3,344,210 A | 9/1967 | Silvia |
| 3,362,859 A | 1/1968 | Sutton |
| 3,422,880 A | 1/1969 | Brown et al. |
| 3,433,196 A | 3/1969 | Sjoblom |
| 3,437,534 A | 4/1969 | McEwan et al. |
| 3,596,602 A | 8/1971 | Gey et al. |
| 3,632,458 A | 1/1972 | Filter et al. |
| 3,661,083 A | 5/1972 | Weinholt |
| 3,831,520 A | 8/1974 | Bowen et al. |

(Continued)

FOREIGN PATENT DOCUMENTS

EP    1 348 683 A2    10/2003

(Continued)

OTHER PUBLICATIONS

J. Grant, editor, Hackh's Chemical Dictionary, third edition, McGraw-Hill Book Company, Inc., New York, 1944 (no month), excerpt pp. 845-846.*

(Continued)

*Primary Examiner*—Marianne L Padgett
(74) *Attorney, Agent, or Firm*—Buchanan Ingersoll & Rooney PC

(57) ABSTRACT

Methods of making multi-layered, hydrogen-containing thermite structures including at least one metal layer and at least one metal oxide layer adjacent to the metal layer are disclosed. At least one of the metal layers contains hydrogen, which can be introduced by plasma hydrogenation. The thermite structures can have high hydrogen contents and small dimensions, such as micrometer-sized and nanometer-sized dimensions.

37 Claims, 2 Drawing Sheets

U.S. PATENT DOCUMENTS

| | | | |
|---|---|---|---|
| 3,961,576 A | 6/1976 | Montgomery, Jr. | |
| 4,129,465 A | 12/1978 | Johnson et al. | |
| 4,757,764 A * | 7/1988 | Thureson et al. | 102/312 |
| 4,933,241 A * | 6/1990 | Holt et al. | 428/689 |
| 4,996,922 A | 3/1991 | Halcomb et al. | |
| 5,000,093 A | 3/1991 | Rozner et al. | |
| 5,090,322 A | 2/1992 | Allford | |
| 5,392,713 A | 2/1995 | Brown et al. | |
| 5,401,340 A | 3/1995 | Doll et al. | |
| 5,429,691 A | 7/1995 | Hinshaw et al. | |
| 5,439,537 A | 8/1995 | Hinshaw et al. | |
| 5,505,799 A | 4/1996 | Makowiecki | |
| 5,509,357 A | 4/1996 | Lawther | |
| 5,538,798 A | 7/1996 | Barbee, Jr. et al. | |
| 5,544,589 A | 8/1996 | Held | |
| 5,547,715 A | 8/1996 | Barbee, Jr. et al. | |
| 5,567,908 A | 10/1996 | Mc Cubbin et al. | |
| 5,700,974 A | 12/1997 | Taylor | |
| 5,717,159 A | 2/1998 | Dixon et al. | |
| 5,732,634 A | 3/1998 | Flickinger et al. | |
| 5,773,748 A | 6/1998 | Makowiecki et al. | |
| 5,852,256 A | 12/1998 | Hornig | |
| 5,912,069 A | 6/1999 | Yializis et al. | |
| 5,936,184 A | 8/1999 | Majerus et al. | |
| 6,276,276 B1 | 8/2001 | Erickson | |
| 6,276,277 B1 | 8/2001 | Schmacker | |
| 6,382,105 B1 | 5/2002 | Jones | |
| 6,443,789 B2 | 9/2002 | Tominetti et al. | |
| 6,494,140 B1 | 12/2002 | Webster | |
| 6,597,850 B2 | 7/2003 | Andrieu et al. | |
| 6,627,013 B2 | 9/2003 | Carter et al. | |
| 6,679,960 B2 | 1/2004 | Jones | |
| 6,682,281 B1 | 1/2004 | Larsen | |
| 6,682,817 B1 | 1/2004 | della Porta et al. | |
| 6,713,177 B2 * | 3/2004 | George et al. | 428/402 |
| 6,720,204 B2 | 4/2004 | Sudijono et al. | |
| 6,736,942 B2 | 5/2004 | Weihs et al. | |
| 6,843,868 B1 | 1/2005 | Fawis et al. | |
| 6,846,372 B1 | 1/2005 | Guirguis | |
| 6,863,992 B2 * | 3/2005 | Weihs et al. | 428/607 |
| 6,962,634 B2 | 11/2005 | Nielson et al. | |
| 6,991,860 B2 | 1/2006 | Phillips et al. | |
| 7,278,354 B1 * | 10/2007 | Langan et al. | 102/306 |
| 7,383,775 B1 | 6/2008 | Mock et al. | |
| 7,718,016 B2 * | 5/2010 | Johnson et al. | 148/535 |
| 2001/0046597 A1 | 11/2001 | Weihs et al. | |
| 2002/0069944 A1 | 6/2002 | Weihs et al. | |
| 2003/0037692 A1 | 2/2003 | Liu | |
| 2003/0164289 A1 | 9/2003 | Weihs et al. | |
| 2003/0203105 A1 | 10/2003 | Porta et al. | |
| 2004/0060625 A1 | 4/2004 | Barbee, Jr. et al. | |
| 2004/0101686 A1 | 5/2004 | Porta et al. | |
| 2004/0151845 A1 * | 8/2004 | Nguyen et al. | 427/569 |
| 2004/0244889 A1 | 12/2004 | Sailor et al. | |
| 2005/0002856 A1 * | 1/2005 | Zaluska et al. | 423/648.1 |
| 2005/0011395 A1 | 1/2005 | Langan et al. | |
| 2005/0100756 A1 * | 5/2005 | Langan et al. | 428/617 |
| 2005/0126783 A1 | 6/2005 | Grattan et al. | |
| 2005/0142495 A1 | 6/2005 | Van Heerden et al. | |
| 2005/0183618 A1 | 8/2005 | Nechitailo | |
| 2005/0189050 A1 | 9/2005 | Sheridan | |
| 2005/0199323 A1 | 9/2005 | Nielson et al. | |
| 2005/0235862 A1 | 10/2005 | Gousman et al. | |
| 2007/0169862 A1 | 7/2007 | Hugus et al. | |
| 2007/0272112 A1 | 11/2007 | Nielson et al. | |
| 2007/0277914 A1 | 12/2007 | Hugus et al. | |
| 2008/0035007 A1 | 2/2008 | Nielson et al. | |
| 2008/0202373 A1 | 8/2008 | Hugus et al. | |
| 2009/0221135 A1 * | 9/2009 | Gangopadhyay et al. | 438/486 |

FOREIGN PATENT DOCUMENTS

| | | |
|---|---|---|
| EP | 1 659 359 A1 | 5/2006 |
| FR | 1585162 | 1/1970 |
| FR | 2867469 A | 9/2005 |
| GB | 1 507 119 | 4/1978 |
| GB | 2 260 317 A | 4/1993 |
| GB | 2 412 116 A | 9/2005 |
| WO | WO 02/16128 A1 | 2/2002 |

OTHER PUBLICATIONS

R. J. Lewis, Sr., editor, Hawley's Condensed Chemical Dictionary, 12th edition Van Nostrand Reinhold Co., New York, 1993 (no month), excerpt, p. 1139.*

H. Bennett, editor, Concise Chemical and Technical Dictionary, third enlarged edition, chemical publishing company, Inc., New York, NY, 1974 (no month), excerpt p. 1037.*

Webster's Ninth New Collegiate Dictionary, Merriam-Webster's Inc., Springfield, Massachusetts, USA, 1990 (no month), excerpt p. 1224.*

S.H. Fischer and M.C. Grubelich, "A Survey of Combustible Metals, Thermites, and Intermetallics for Pyrotechnic Applications," American Institute of Aeronautics and Astronautics, Inc., AIAA Meeting Papers on Disc, Jul. 1996, pp. 1-13.

L.Q. Shi et al., "Investigation of the Hydrogenation Properties of Zr Films Under Unclean Plasma Conditions," J. Vac. Sci. Technol. A 20(6), Nov./Dec. 2002, pp. 1840-1845, American Vacuum Society.

Seman, Michael et al., "Investigation of the role of plasma conditions on the deposition rate and electrochromic performance of tungsten oxide thin films", *J. Mac. Sci. Technol.*, A21(6), Nov./Dec. 2003, pp. 1927-1933.

Sheridan, Copending U.S. Appl. No. 10/923,865, filed Aug. 24, 2004 entitled "Energetic Material Composition".

Johnson et al, Copending U.S. Appl. No. 11/399,392, filed Apr. 7, 2006 entitled "Methods of Making Multilayered, Hydrogen-Containing Intermetallic Structures".

Hugus et al., U.S. Appl. No. 11/649,818, filed Jan. 5, 2007 entitled "Solid Compsite Propellants and Methods of Making Propellants".

Sheridan et al., U.S. Appl. No. 11/451,313, filed Jun. 13, 2006 entitled "Enhanced Blast Explosive".

Hugus et al., U.S. Appl. No. 11/649,818, filed Jan. 5, 2007 entitled "Solid Compsite Propellants and Methods of Making Propellants".

Hugus et. al, Copending U.S. Appl. No. 11/504,808, filed Aug. 16, 2006 entitled "Metal Binders for Thermobaric Weapons".

Hugus et al., Copending U.S. Appl. No. 11/447,068, filed Jun. 6, 2006 entitled "Metal Matrix Composite Energetic Structures".

Hugus et al., Copending U.S. Appl. No. 11/447,069, filed Jun. 6, 2006 entitled "Structural Metallic Binders for Reactive Fragmentation Weapons".

Sheridan et al., Copending U.S. Appl. No. 11/806,221, filed May 30, 2007 entitled "Selectable Effect Warhead".

McDonough, James Ertic, "Thermodynamic and Kinetic Studies of Ligand Binding, Oxidative Addition, and Group/Atom Transfer in Group VI Metal Complexes": Dec. 2005, pp. 108-149 no publisher.

Boyd, J.M., "Thin-Film Electric Initiator. III. Application of Explosives and Performance Tests", U.S. Army Material Command, Harry Diamond Laboratories, Washington, DC 20438, Report No. -HDL_TR-1414, (Jan. 1969), 28.

* cited by examiner

METHODS OF MAKING MULTILAYERED, HYDROGEN-CONTAINING THERMITE STRUCTURES

BACKGROUND

Thermite reactions involve the release of thermal energy through an exothermic oxygen rearrangement reaction between a reactive metal and a metal oxide. Thermite reactions can produce solid, liquid and/or gaseous products. Metals and metal oxides that undergo thermite reactions can be used, for example, in thermite torches, additives to explosives and propellants, and airbag gas generator materials.

SUMMARY

Methods of making multi-layered, hydrogen-containing thermite structures are provided. An exemplary embodiment of the methods comprises depositing a metal layer; depositing a metal oxide layer, the metal layer and the metal oxide layer contacting each other and having respective compositions effective to undergo a thermite reaction when activated; and introducing hydrogen into at least the metal layer by plasma hydrogenation.

Another exemplary embodiment of the methods of making a multilayered, hydrogen-containing thermite structure comprises depositing a first metal layer; depositing a first metal oxide layer, the first metal layer and the first metal oxide layer contacting each other and having respective compositions effective to undergo a first thermite reaction when activated; depositing a second metal layer; depositing a second metal oxide layer, the second metal layer and the second metal oxide layer contacting each other and having respective compositions effective to undergo a second thermite reaction when activated; and introducing hydrogen into at least one of the first and second metal layers by plasma hydrogenation; wherein each of the first and second metal layers and each of the first and second metal oxide layers has a thickness of less than about 100 nm.

Another exemplary embodiment of the methods of making a multilayered, hydrogen-containing thermite structure comprises depositing a plurality of metal layers and metal oxide layers to form a multilayered thermite structure, the thermite structure including at least one metal layer and at least one adjacent metal oxide layer having respective compositions effective to undergo a thermite reaction with each other when activated; and introducing hydrogen into at least one metal layer by plasma hydrogenation; wherein each of the metal layers and each of the metal oxide layers has a thickness of less than about 100 nm.

DETAILED DESCRIPTION

Multilayered, hydrogen-containing thermite structures that can be made by exemplary embodiments of the methods of making such thermite structures described herein include one or more metals and one or more metal oxides that have respective compositions effective to undergo one or more thermite reactions with each other when the structures are activated. As used herein, the term "activated" means to ignite by any suitable technique, such as by use of a thermal impulse, an exploding bridgewire, a semiconductor bridge igniter, laser impingement, mechanical methods, and the like. When activated, at least one metal and at least one metal oxide of the multi-layered thermite structure mix and undergo a thermite reaction, thereby releasing energy and producing a reaction product. The reaction products of the thermite reaction can be solids, liquids and/or gases.

One or more metal layers of the multilayered thermite structures contain hydrogen. Hydrogen contained in the thermite structures is released in gaseous form when the structures are activated. Because the metal layers contain hydrogen, the thermite structures can produce a greater amount of heat when activated as compared to structures that do not contain this hydrogen. The structures can include metal layers of different metals, which can have substantially the same or different hydrogen contents from each other.

The multi-layered thermite structures can have micrometer-sized or nanometer-sized dimensions. By having such small dimensions, the distance between the metal and metal oxide reactants of one or more thermite reactions is decreased in the structures as compared to larger structures and, consequently, energy can be released more rapidly from the thermite structures when they are activated. The thermite structures can rapidly release a high amount of energy per unit volume of the structures when activated.

Figure 1:
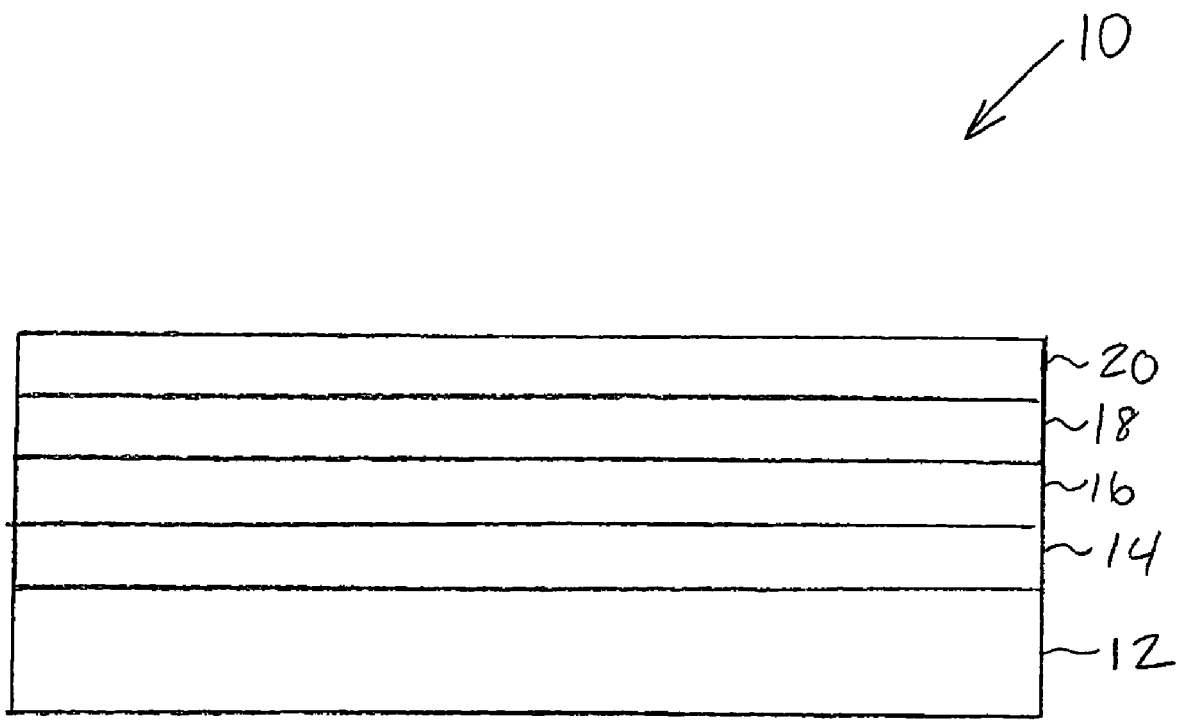
FIG. 1 illustrates an exemplary embodiment of a multilayered thermite structure.

FIG. 1 illustrates an exemplary embodiment of a multilayered thermite structure 10 that can be made by the methods described herein. The thermite structure 10 include a substrate 12, a first metal layer 14 on the substrate 12, a first metal oxide layer 16 adjacent the first metal layer 14, a second metal layer 18 adjacent the first metal oxide layer 16, and a second metal oxide layer 20 adjacent the second metal layer 18. In an exemplary embodiment, the first metal layer 14 and/or the second metal layer 18 can contain hydrogen. Other embodiments of the multilayered structures can include less than 4 total layers, e.g., 2 layers, or more than 4 total layers, such as 10, 50, 100, 500, 1000 or more layers.

The arrangement of the metal layers and metal oxide layers in the multilayered thermite structure is not limited to the arrangement shown in FIG. 1. For example, in another exemplary embodiment of the thermite structures, a metal oxide layer can be deposited on a substrate, a metal layer can be deposited adjacent the metal oxide layer, and this alternating layer structure can be repeated to produce a multilayered thermite structure having a desired total number of layers.

In an exemplary embodiment, the metal and metal oxide layers of the multilayered thermite structure can have a maximum total thickness of about 100 µm, such as about 50 µm, about 10 µm, about 1 µm, or about 100 nm. The individual metal layers and metal oxide layers of the multilayered thermite structures can have a thickness of less than about 100 nm, such as less than about 75 nm, less than about 50 nm, less than about 30 nm, or less than about 10 nm. The metal layers can have different thicknesses from each other, the metal oxide layers can have different thicknesses from each other, and/or the metal layers and the metal oxide layers can have different thicknesses from each other, in a given multilayered thermite structure.

In an exemplary embodiment of the multilayered thermite structure 10, the first metal layer 14 and second metal layer 18 are composed of the same metal, and the first metal oxide layer 16 and the second metal oxide layer 20 are composed of the same metal oxide, which can undergo a thermite reaction with the metal when the structure is activated.

In another exemplary embodiment of the multilayered thermite structure 10, the first metal layer 14 is composed of a first metal, the second metal layer 18 is composed of a different second metal, and the first metal oxide layer 16 and second metal oxide layer 20 are composed of the same metal oxide. In the embodiment, the metal oxide material is effective to undergo a first thermite reaction with the first metal and a different, second thermite reaction with the second metal. This arrangement of metal and metal oxide layers can be repeated any desired number of times to produce a multilayered thermite structure including additional layers.

In yet another exemplary embodiment of the multilayered thermite structure 10, the first metal layer 14 and second metal layer 18 are of the same metal, the first metal oxide layer 16 is of a first metal oxide and the second metal oxide layer 20 is of a different second metal oxide. In the embodiment, the metal has a composition effective to undergo a first thermite reaction with the first metal oxide and a different, second thermite reaction with the second metal oxide. This arrangement of metal and metal oxide layers can be repeated any desired number of times to produce a multilayered thermite structure including additional layers.

Accordingly, embodiments of the multilayered thermite structure can include layers of various combinations of metals and metal oxides that are effective to undergo a single thermite reaction, or various combinations of metals and metal oxides that are effective to undergo two or more different thermite reactions, when the structure is activated.

The metals and metal oxides that are used to form the multilayered thermite structures can be selected based on their ability to undergo one or more thermite reactions having a sufficiently high heat of reaction to release a desirably high amount of energy when activated. The metals and metal oxides of the respective metal and metal oxide layers are preferably, but are not limited to, pure metals and metal oxides, respectively. Thermodynamic values for thermite reactions are described in S.H. Fischer and M. C. Grubelich, "A survey of combustible metals, thermites, and intermetallics for pyrotechnic applications," American Institute of Aeronautics and Astronautics, Inc., AIAA Meeting Papers on Disc, July 1996, pp. 1-13. Exemplary embodiments of the multilayered thermite structures can include one or more of the following pairs of metals and metal oxides arranged in respective alternating layered structures: $Ti/CuO$, $Ti/Pb_3O_4$, $Zr/CuO$, $Ti/Fe_2O_3$, $Ti/Fe_3O_4$, $Ti/MnO_2$, $Zr/Fe_2O_3$ and $Zr/MnO_2$. These pairs of metals and metal oxides undergo the following thermite reactions with the corresponding heats of reaction, $-Q$, based on mass and volume of the reactants:

(a) $Ti/CuO$: (1) $Ti+2 CuO$ ($-Q=730.5$ cal/g or $4259$ cal/cm$^3$);
(b) $Ti/Pb_3O_4$: $2Ti+Pb_3O_4$ ($-Q=358.1$ cal/g or $2896$ cal/cm$^3$);
(c) $Zr/CuO$: $Zr+2CuO$ ($-Q=752.9$ cal/g or $4818$ cal/cm$^3$);
(d) $Ti/Fe_2O_3$: $3Ti+2Fe_2O_3$ ($-Q=612$ cal/g or $3066$ cal/cm$^3$);
(e) $Ti/Fe_3O_4$: $Ti+Fe_3O_4$ ($-Q=563$ cal/g or $2800$ cal/cm$^3$);
(f) $Ti/MnO_2$: $Ti+MnO_2$ ($-Q=752.7$ cal/g or $3633$ cal/cm$^3$);
(g) $Zr/Fe_2O_3$: $3Zr+2Fe_2O_3$ ($-Q=666.2$ cal/g or $3827$ cal/cm$^3$); and
(h) $Zr/MnO_2$: $Zr+MnO_2$ ($-Q=778.7$ cal/g or $4398$ cal/cm$^3$).

In an exemplary embodiment, the multilayered thermite structure includes alternating layers of Ti and $Fe_2O_3$, which can undergo thermite reaction (d) and/or (e). In another exemplary embodiment, the multilayered thermite structure includes alternating layers of $Ti/CuO/Ti/Fe_2O_3$, where Ti and CuO and Ti and $Fe_2O_3$, respectively, can undergo two different thermite reactions (e.g., thermite reactions (a) and (d), respectively). In another exemplary embodiment, the multilayered thermite structure includes alternating layers of Ti/CuO/Zr, where Ti and CuO and Zr and CuO, respectively, can undergo two different thermite reactions (e.g., thermite reactions (a) and (c), respectively).

The metal and metal oxide layers of the multilayered thermite structures can be deposited on any suitable substrate material. For example, the substrate can be composed of a metal, ceramic, glass, semiconductor or polymer material, or a combination of two or more of these materials. The substrate can have any suitable shape and size, such as that of a tube, sheet, or the like. The multilayered thermite structures can be formed on one or more selected surfaces and/or surface regions of the substrate. In an embodiment, the substrate is preferably retained as part of the multilayered structure. In another embodiment, the substrate is removed using any suitable technique after forming the multilayer structure.

The metal layers of the multilayered thermite structure can be deposited by any suitable deposition technique(s). For example, the metal layers can be deposited by chemical vapor deposition (CVD), low-pressure chemical vapor deposition (LPCVD), plasma enhanced chemical vapor deposition (PECVD), sputtering, and the like. The deposition technique that is utilized to produce a particular thermite structure can be selected based on various factors, such as the particular metal layer composition that is to be deposited.

The metal oxide layer(s) of the thermite structures can be deposited by any suitable technique(s) for metal oxide deposition. For example, the metal oxide layers can be deposited by electron beam evaporation, ion-assisted deposition, sputter deposition, PECVD, and the like.

The metal layer(s) and metal oxide layer(s) can be deposited in the same reaction chamber, or in different reaction chambers (e.g., in a deposition tool including multiple interconnected process chambers). For example, metal and metal oxide layers can be deposited in the same reaction chamber by sputter deposition using a multi-material target, e.g., a target including regions of the metal and metal oxide materials. Alternatively, the target can include the metal of the metal oxide to be deposited, and an oxygen gas source can be utilized for depositing metal oxide layers from the sputtered metal.

According to exemplary embodiments of the methods, the multilayered thermite structures are preferably subjected to plasma hydrogenation to introduce hydrogen into one or more metal layers, preferably into all of the metal layers. During plasma hydrogenation, a structure including at least one deposited metal layer can be placed in a plasma reaction chamber connected to a hydrogen (e.g., $H_2$) gas source. A power source is activated to energize the hydrogen to generate hydrogen plasma in the reaction chamber. For example, the power source can supply RF power, microwaves, or like. RF power can be inductively coupled to the hydrogen gas using a coil, or power can be capacitively coupled to the hydrogen gas using a parallel-plate electrode arrangement. The RF input power can be, e.g., from about 200 W to about 600 W to generate plasma. The input power can be supplied at a frequency of about 100 kHz to about 2.45 GHz. The substrate can be heated to a temperature above ambient temperature in the plasma reaction chamber, e.g., from about 50° C. to about 125° C. during the plasma hydrogenation treatment. Hydrogen gas is supplied to the plasma reaction chamber at a suitable flow rate, such as from about 50 sccm to about 500 sccm. The plasma reaction chamber is maintained at a desired pressure during the plasma hydrogenation process, e.g., from about 10 to about 1000 mTorr.

The hydrogen plasma is effective to introduce hydrogen into at least one metal that forms one or more layers of the thermite structure. Depending on the composition of the substrate, the hydrogen can also be introduced into the substrate during the plasma hydrogenation treatment. For example, the substrate can be of a metal that can be plasma hydrogenated, such as Zr or Ti, which can also be used to form metal layers of the structure. The plasma hydrogenation treatment is continued for an amount of time effective to produce a desired hydrogen concentration in one or more of the metal layers and optionally also in the substrate. For example, the average hydrogen content in one or more of the metal layers and optionally in the substrate can be at least 50 at %, preferably from about 50 at % to about 70 at %. By varying the plasma hydrogenation process conditions, different hydrogen profiles in the metal layers can be produced.

Plasma hydrogenation can introduce hydrogen into metal layers of the structure such that the hydrogen sits interstitially in the metal(s). In this manner, the multilayered thermite structures can have a high energy content without sacrificing volume of the structures. To facilitate plasma hydrogenation, the hydrogen plasma can remove surface oxide layers on the metal layers by the formation of OH and $H_2O$, organic residues can be extracted due to reaction with atomic hydrogen, radiation and plasma heating can enhance surface activation of the metal layers, hydrogen can diffuse rapidly in selected metals, and ion species crossing the plasma sheath are implanted into near-surface regions of the metal layers.

In an exemplary embodiment, the thermite structures can be subjected to plasma hydrogenation after each metal layer is deposited so that the surface area of the last-deposited metal layer that is exposed to the plasma is enhanced. In another exemplary embodiment, the thermite structures can be subjected to plasma hydrogenation each time that a selected number of metal layers, e.g., 10 metal layers, have been deposited. In yet another exemplary embodiment, the thermite structures can be subjected to plasma hydrogenation once after all of the metal layers have been deposited.

The hydrogen content of the metal layers of the multilayered thermite structures can be characterized using Nuclear Reaction Analysis (NRA). The NRA technique provides depth profiling of hydrogen near a sample surface using a mass 15 nitrogen beam. In this technique, a sample is placed in a vacuum test chamber at a base pressure of at least about $1 \times 10^{-5}$ Torr. A beam of nitrogen having an energy level of at least 6.38 MeV is directed into the sample. Gamma ray output (due to the presence of hydrogen in the sample) is measured with a bismuth germanium oxide (BGO) scintillation detector. Using a parameter of the pre-calibrated chamber, the flux of gamma rays at each energy step is converted to a measurement of hydrogen concentration in the sample. To convert raw data (counts vs. energy) to H concentration vs. depth of the sample, the stopping power of mass 15 nitrogen ions in the sample materials is determined. Stopping power values are disclosed in J.F. Ziegler, J.P. Biersack and U. Littmark, "Stopping Powers and Ranges of Ions in Solids," Vol. 1, Pergamon Press, New York (1985).

EXAMPLE

Ti and Zr films are separately deposited to a thickness of about 100 nm by sputter deposition on separate silicon substrates. The substrates are then simultaneously exposed to hydrogen plasma in a plasma reaction chamber using the following processing conditions: substrate temperature/85° C., $H_2$ flow rate/100 sccm, chamber pressure/25 mTorr, RF power/300 W, exposure time/10 min.

Figure 2:
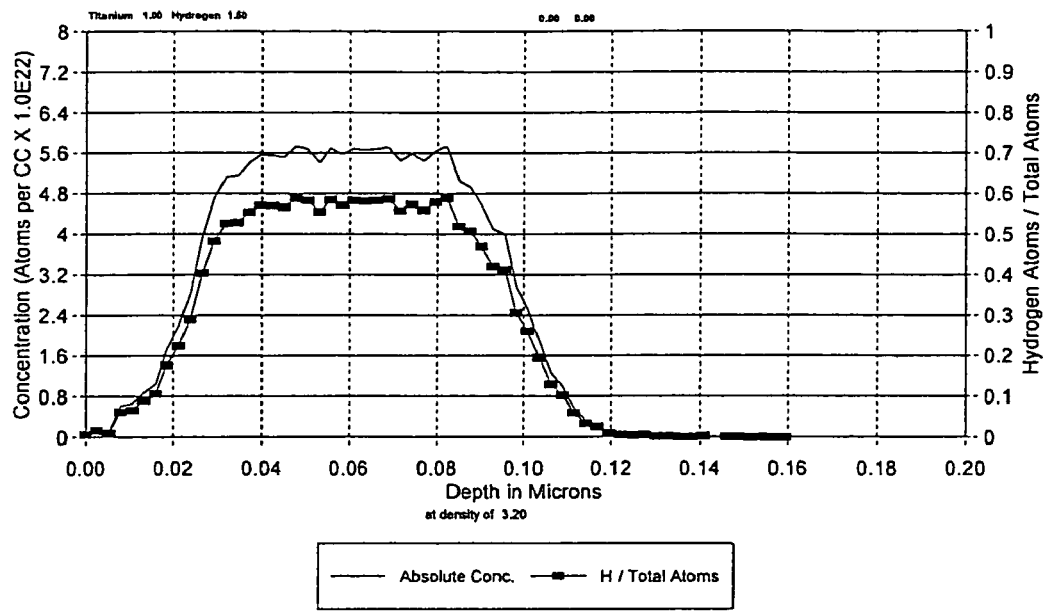
FIG. 2 shows the ratio of hydrogen atoms/total atoms versus depth from a surface of a plasma hydrogenated Ti layer.
Figure 3:
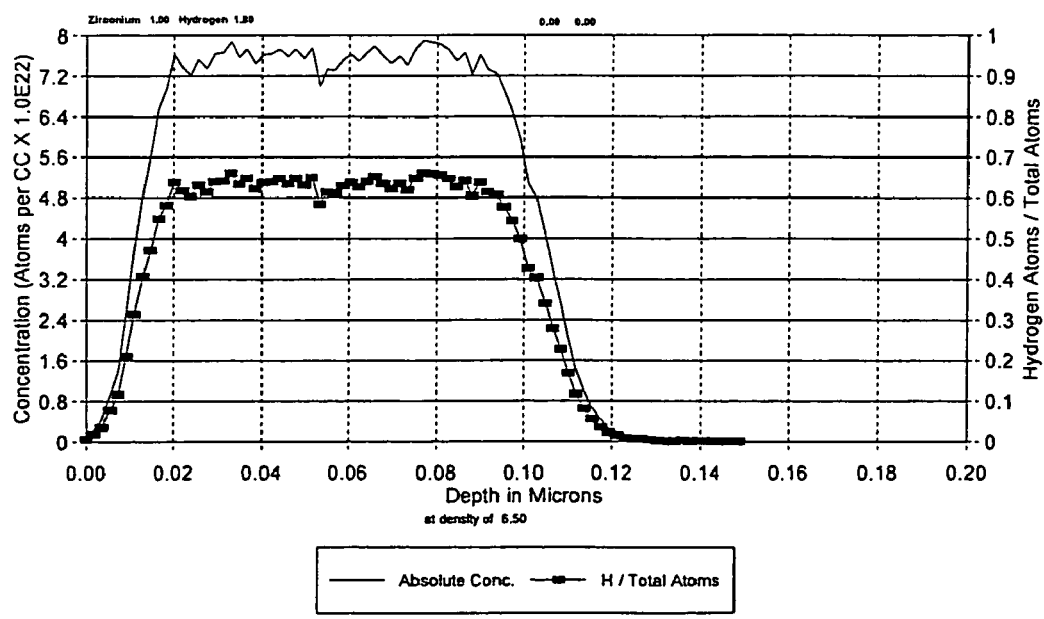
FIG. 3 shows the ratio of hydrogen atoms/total atoms versus depth from layer surface of a plasma hydrogenated Zr layer.

The hydrogen content of the metal films is measured by NRA. FIGS. 2 and 3 show the hydrogen concentration versus depth profiles of the Ti and Zr films, respectively. As shown, the Ti and Zr films have an average 58 at % and 65 at % hydrogen concentration, respectively. These test results demonstrate that thin, highly hydrogenated metal films can be produced using plasma hydrogenation. Thin metal oxide layers can be formed using a suitable deposition technique to produce multilayered thermite structures.

The multi-layered thermite structures can be used in applications in which their ability to rapidly release high amounts of reaction energy per unit volume of the energetic material are desirable. The compositions of the metal and metal oxide layers can be selected to provide desired thermite reactions that release a desired amount of energy and produce desired reaction products. The compositions of the metal and metal oxide layers can be selected that have high activation temperatures to provide stability to temperature fluctuations, shock and environmental effects.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A method of making a multilayered, hydrogen-containing thermite structure, the method comprising:
   depositing a metal layer;
   depositing a metal oxide layer, the metal layer and the metal oxide layer contacting each other and having respective compositions effective to undergo a thermite reaction when activated, thereby forming an initial structure; and
   introducing hydrogen into the metal layer by plasma hydrogenation after the metal layer has been deposited;
   whereby the multilayered, hydrogen-containing thermite structure is thus formed.

2. The method of claim 1, wherein the metal layer and the metal oxide layer are of a combination of materials selected from the group consisting of Ti/CuO, Ti/$Pb_3O_4$, Zr/CuO, Ti/$Fe_2O_3$, Ti/$Fe_3O_4$, Ti/$MnO_2$, Zr/$Fe_2O_3$ and Zr/$MnO_2$.

3. The method of claim 2, wherein the metal layer and the metal oxide layer are of a combination of materials selected from the group consisting of Ti/CuO, Ti/$Pb_3O_4$ and Zr/CuO.

4. The method of claim 1, wherein the metal layer is subjected to plasma hydrogenation before the metal oxide layer is deposited.

5. The method of claim 1, wherein the metal layer has an average hydrogen concentration of at least about 50 at % after the plasma hydrogenation.

6. The method of claim 5, wherein the metal layer has an average hydrogen concentration of at least about 60 at % after the plasma hydrogenation.

7. The method of claim 1, wherein one of the metal layer and the metal oxide layer is deposited on a substrate of a material selected from the group consisting of metals, ceramics, glasses, semiconductors, polymers and combinations thereof.

8. The method of claim 7, wherein:
   the substrate is of a metal; and
   the method further comprises introducing hydrogen into the substrate by plasma hydrogenation.

9. The method of claim 1, wherein each of the metal layer and the metal oxide layer has a thickness of less than about 100 nm.

10. The method of claim 9, wherein each of the metal layer and the metal oxide layer has a thickness of less than about 10 nm.

11. The method of claim 1, wherein the hydrogen introduced by plasma hydrogenation sits interstitially in the metal layer.

12. The method of claim 1, wherein the plasma hydrogenation comprises:
   placing the metal layer or the initial structure in a reaction chamber;
   supplying hydrogen gas into the chamber at a rate of about 50 sccm to about 500 sccm; and
   energizing the hydrogen gas in the chamber.

13. The method of claim 12, wherein the hydrogen gas is energized by a RF power source having an input power of about 200 W to about 600 W, and a frequency of about 100 KHz to about 2.45 GHz.

14. The method of claim 13, wherein the metal layer or the initial structure is heated to about 50° C. to about 125° C.

15. The method of claim 14, wherein the chamber is maintained at a pressure of about 10 to about 1,000 mTorr during hydrogenation.

16. A method of making a multilayered, hydrogen-containing thermite structure, the method comprising:
depositing a first metal layer;
depositing a first metal oxide layer, the first metal layer and the first metal oxide layer contacting each other and having respective compositions effective to undergo a first thermite reaction when activated;
depositing a second metal layer;
depositing a second metal oxide layer, the second metal layer and the second metal oxide layer contacting each other and having respective compositions effective to undergo a second thermite reaction when activated; and
introducing hydrogen into at least one of the first and second metal layers by plasma hydrogenation after the first and/or second metal layer has been deposited;
wherein each of the first and second metal layers and each of the first and second metal oxide layers has a thickness of less than about 100 nm;
whereby the multilayered, hydrogen-containing thermite structure is thus formed.

17. The method of claim 16, wherein (i) the first metal layer and the first metal oxide layer and (ii) the second metal layer and the second metal oxide layer are of a combination of materials selected from the group consisting of Ti/CuO, Ti/Pb$_3$O$_4$, Zr/CuO, Ti/Fe$_2$O$_3$, Ti/Fe$_3$O$_4$, Ti/MnO$_2$, Zr/Fe$_2$O$_3$ and Zr/MnO$_2$.

18. The method of claim 17, wherein (i) the first metal layer and the first metal oxide layer and (ii) the second metal layer and the second metal oxide layer are of a combination of materials selected from the group consisting of Ti/CuO, Ti/Pb$_3$O$_4$ and Zr/CuO.

19. The method of claim 16, wherein the first metal layer subjected to plasma hydrogenation before the second metal layer is deposited.

20. The method of claim 16, wherein each of the first and second metal layers and each of the first and second metal oxide layers has a thickness of less than about 10 nm.

21. The method of claim 16, wherein:
the first and second metal layers are of the same metal; and
the first and second metal oxide layers are of the same metal oxide.

22. The method of claim 16, wherein:
the first metal layer is of a first metal;
the second metal layer is of a second metal different from the first metal;
the first and second metal oxide layers are of the same metal oxide; and
the first and second thermite reactions are different from each other.

23. The method of claim 16, wherein:
the first and second metal layers are of the same metal;
the first metal oxide layer is of a first metal oxide;
the second metal oxide layer is of a second metal oxide different from the first metal oxide; and
the first and second thermite reactions are different from each other.

24. The method of claim 16, wherein at least one of the first and second metal layers has an average hydrogen concentration of at least about 50 at % after the plasma hydrogenation.

25. The method of claim 16, wherein one of the first and second metal layers and first and second metal oxide layers is deposited on a substrate of a material selected from the group consisting of metals, ceramics, glasses, semiconductors, polymers and combinations thereof.

26. The method of claim 25, wherein:
the substrate is of a metal; and
the method further comprises introducing hydrogen into the substrate by plasma hydrogenation.

27. The method of claim 16, wherein the hydrogen introduced by plasma hydrogenation sits interstitially in at least one of the first and second metal layers.

28. A method of making a multilayered, hydrogen-containing thermite structure, the method comprising:
depositing a plurality of metal layers and metal oxide layers to form a multilayered thermite structure, at least one metal layer and at least one adjacent metal oxide layer contacting each other and having respective compositions effective to undergo a thermite reaction when activated; and
introducing hydrogen into the at least one metal layer by plasma hydrogenation after the at least one metal layer has been deposited;
wherein each of the metal layers and each of the metal oxide layers has a thickness of less than about 100 nm;
whereby the multilayered, hydrogen-containing thermite structure is thus formed.

29. The method of claim 28, wherein the thermite structure comprises adjacent metal layers and metal oxide layers of a combination of materials selected from the group consisting of Ti/CuO, Ti/Pb$_3$O$_4$, Zr/CuO, Ti/Fe$_2$O$_3$, Ti/Fe$_3$O$_4$, Ti/MnO$_2$, Zr/Fe$_2$O$_3$ and Zr/MnO$_2$.

30. The method of claim 28, wherein the thermite structure is subjected to plasma hydrogenation after each metal layer is deposited.

31. The method of claim 28, wherein at least one of the metal layers has an average hydrogen concentration of at least about 50 at % after the plasma hydrogenation.

32. The method of claim 28, wherein one of the metal layers or one of the metal oxide layers is deposited on a substrate of a material selected from the group consisting of metals, ceramics, glasses, semiconductors, polymers and combinations thereof.

33. The method of claim 32, wherein:
the substrate is of a metal; and
the method further comprises introducing hydrogen into the substrate by plasma hydrogenation.

34. The method of claim 28, wherein each of the metal layers has a thickness of less than about 10 nm.

35. The method of claim 28, wherein the thermite structure comprises a total of at least 10 metal layers and metal oxide layers.

36. The method of claim 28, wherein the thermite structure comprises a total of at least 100 metal layers and metal oxide layers.

37. The method of claim 28, wherein the thermite structure comprises a total of at least 1000 metal layers and metal oxide layers.

* * * * *